United States Patent [19]

Reichle

[11] Patent Number: 4,583,256
[45] Date of Patent: Apr. 22, 1986

[54] TOOL FOR CONNECTING A TUBE TO A LOCAL JUNCTION BOX

[75] Inventor: Hans Reichle, Wetzikon, Switzerland

[73] Assignee: Reichle + De Massari AG Elektro-Ingenieure, Wetzikon, Switzerland

[21] Appl. No.: 627,803

[22] Filed: Jul. 5, 1984

[30] Foreign Application Priority Data

Jul. 13, 1983 [CH] Switzerland ............... 3833/83

[51] Int. Cl.⁴ .............................. B26B 11/00
[52] U.S. Cl. ................................ 7/158; 30/96; 408/20; 408/68
[58] Field of Search ............... 29/564.1; 408/68, 20, 408/22, 118, 205; 7/158; 30/130, 96, 97

[56] References Cited

U.S. PATENT DOCUMENTS 983,810  2/1911  Crossley .................. 408/68
1,234,467  7/1917  Hamilton ................. 408/68

FOREIGN PATENT DOCUMENTS 596520  1/1948  United Kingdom .......... 30/130

Primary Examiner—Frank T. Yost
Attorney, Agent, or Firm—Karl F. Ross; Herbert Dubno

[57] ABSTRACT

A tool for making a plug connection between a plastic tube and a plastic case for electrical conductors has a cutting head which is designed to encircle the shell of a tube and which can be turned relatively to the tube. Extending into the interior of the cutting head is a first knife for chamfering the end of the tube as well as a second knife, at a distance from the first, for cutting a fircone-shaped rib in the shell of the tube. The cutting head is firmly connected to one end of a bar-shaped handle, which is provided at its other end with a bore head for making a hole in the wall of the case. The bore head comprises a cutter on an end of a steel hollow cylinder connected at its other end to the handle and projecting out from its respective front end. A protective and centering plunger is slidable against the effect of a spring within the hollow cylinder coaxially with the handle, the plunger forming on its free end a pressure plate which, in the normal state of the tool, projects above the cutter on the hollow cylinder.

4 Claims, 3 Drawing Figures

U.S. Patent
Apr. 22, 1986
4,583,256
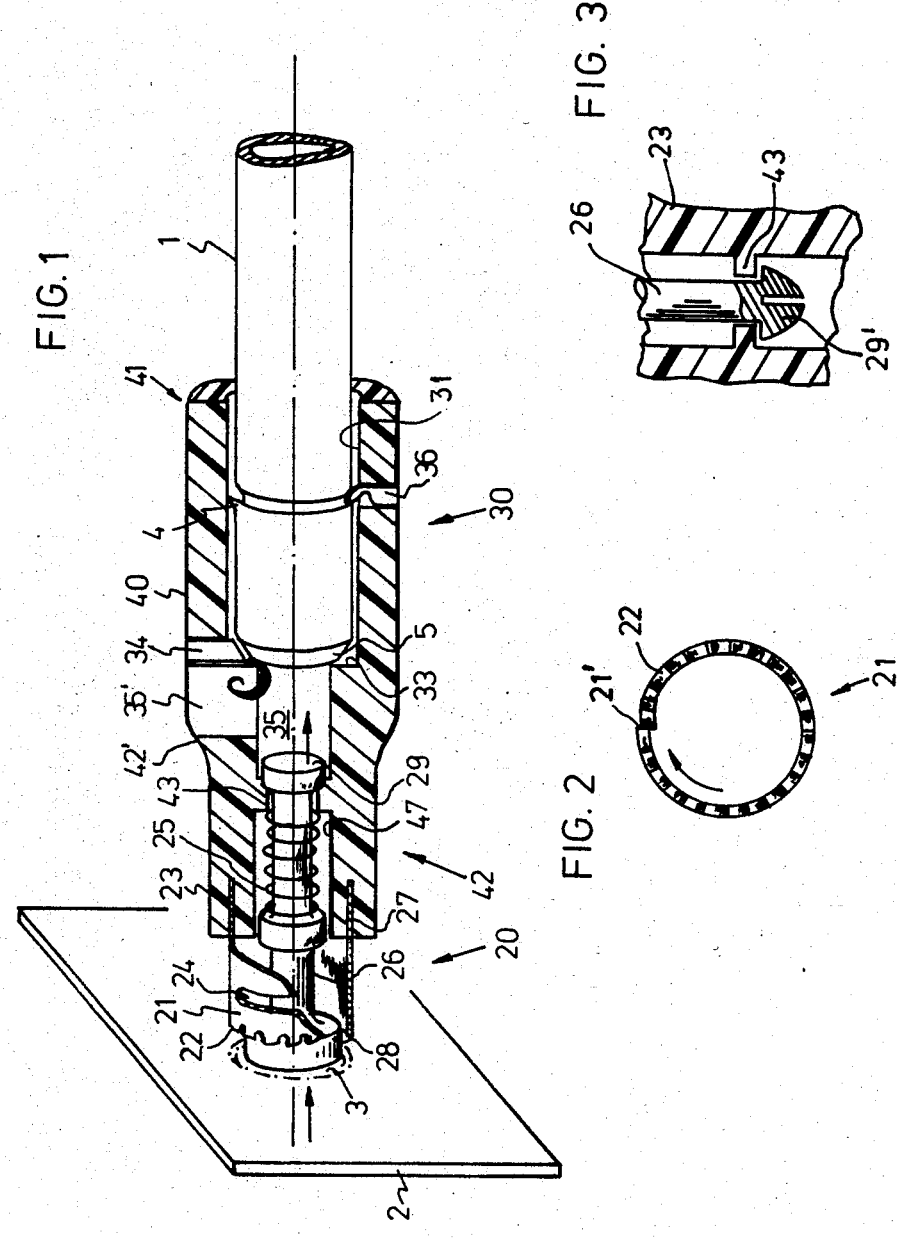

TOOL FOR CONNECTING A TUBE TO A LOCAL JUNCTION BOX

FIELD OF THE INVENTION

The present invention relates to a new and improved tool for making a plug connection between a plastic tube and a plastic case for electrical connections, the tool having a cutting head which is designed to encircle the tube and can be turned relatively to the tube a first knife for chamfering the end of the tube encircled by the head a second knife at a distance from the first for cutting a fir-cone-shaped rib in the periphery of the tube, a bar-shaped handle connected to the cutting head and a bore head at the other end of the handle for making a hole in the wall of the case.

BACKGROUND OF THE INVENTION

In laying electric conductors on concrete forms prior to embedding in concrete, or in the erection of hollow walls, there is a problem with secure attachment of the conduit or tubes with so-called junction boxes which later serve for the running of cables and which are, as a rule, made of plastic and have a very smooth surface. Secure attachment is necessary in order to prevent a shifting of the tubes when cables are later laid and when concrete is poured in and vibrated. In addition, the connections between tubes and boxes should fit as tightly as possible.

A tool for this purpose has already been made known by the applicant, and can form a chamfer on the end of the tube, and cut a fir-cone-shaped rib into the outer surface of the tube at a distance from the end of the tube so that the raised rib engages the wall of the inlet case and acts as a stop upon partial withdrawal of the tube end out of the through bore or hole cut in the case or box. This prevents the end from being pulled out of the box due to strain on the tube during the pouring of the concrete or the laying of cables, since the fir-cone-shaped rib forms an effective stop. The interaction of hole, tube and rib provides, moreover, a sufficiently tight-fitting seal against the penetration of dampness into the box. Furthermore, the chamfer of the end of the tube facilitates the insertion of the tube into the hole.

Problematic with such a tool is, however, the bore head for making the through bore in the plastic case, which apart from the previously-mentioned inlet case, can also be any other box for electrical installations. These problems include the great danger of injury to the user from the exposed bore head and the fact that it is easily damaged, and the difficulties with definite, centered positioning of the bore head on the smooth wall of the case.

OBJECT OF THE INVENTION

Therefore, it is a primary object of the present invention to provide an improved tool of the previously-mentioned type, which ensures sufficient protection of the bore head against damage, protection against injury of the user on the bore head and definite positioning of the bore head on the wall of the case.

SUMMARY OF THE INVENTION

This is achieved according to invention in that the bore head comprises a cutting edge on the front end of a steel hollow cylinder, with said hollow cylinder firmly connected with its other end to the handle. The bore head has a protective and centering plunger, which is slidable against the effect of a spring inside the hollow cylinder and coaxially with the handle, said plunger forming on its free end a pressure plate, which, in the normal state of the tool, projects beyond the cutter on the hollow cylinder.

As a result a user cannot injure himself on the bore head upon picking up the tool, since access to the cutter is to be prevented by the pressure plate. This arrangement also prevents damage to the cutter of the bore head.

A further advantage is attained in that the tool can now be set precisely onto the desired place by means of the pressure plate, and the cutter can be effective on the wall of the case relatively gently and without catching.

The outer end position of the plunger, and the pressure plate can be defined by an inner terminal flange on the plunger, which interacts with an inner ring shoulder in the guide bore for the plunger in the handle. One end of the spring can be supported on the inner ring shoulder in the guide bore of the handle and the other end of the spring seated on a ring shoulder of the plunger.

Furthermore, an ergonomic handling of the tool is attained when the handle grip side opposite the bore head, is oval or elliptical in cross section, and the handle grip side for the cutting head, is of lesser and at least approximately round cross section, with the transition region from the smaller handle circumference to the larger handle circumference constituting the stop face for the hand clasping the smaller handle circumference.

This permits with the clasping hand a slip-free, high torsional moment to be transferred to the bore head, and, moreover, makes possible a high axial pressure of the cutting head against the tube.

BRIEF DESCRIPTION OF THE DRAWING

The invention will be better understood and objects other than those set forth above will become apparent when consideration is given to the following detailed description thereof. Such description makes reference to the annexed drawing:

FIG. 1 is a diagrammatic axial section through the tool according to invention;

FIG. 2 is an end view of the steel hollow cylinder forming the cutter of the tool according to FIG. 1; and FIG. 3 is a detail of a view of a modification of the arrangement according to FIG. 1.

SPECIFIC DESCRIPTION

The tool for making a plug connection between a plastic tube 1 and a plastic case 2 for electrical conductors comprises in known manner a bore head 20 for making the through bore 3 in the wall of the case 2, as well as a cutting head 30 for simultaneously for cutting chamfering at 5 the end of the tube and a fir-cone-shaped rib 4 in the tube 1.

The bore head 30 and the cutting head 20 are each in the way more specifically described below firmly secured one on each end of a bar-shaped handle 40, which is composed of an appropriate material, for example, plastic. In this connection, the handle is ergonomically according to invention so developed that a grip 41 is formed to enable the bore head 20 to be rotated. This grip has an oval shape in cross section, which permits with the clasping hand a slip-free, high torsional moment to be transferred onto the bore head 20. The grip 42 for the cutting head 30, however, of lesser diameter and round cross section, with the transition region 42' towards the grip side 41 constituting a stop face for the clasping hand, which permits in the direction of the tube 1 to be gripped, a higher axial pressure to be exerted in order to force the tube 1 on the inner stop 33 of the cutting head 30.

The cutting head 30 comprises here a concentric bore 31, of approximately the usual tube diameter, which terminates on a ring shoulder that constitutes the previously-mentioned stop 33. In a plane adjacent to the plane of the stop 33, a first knife 34 extends, of which the cutting edge is to constructed that, at a relative turning between the tube 1 and the cutting head 30, the chamfer 5 on the end of the tube is cut. The cutting edge of this knife can, however, also be such that at the same time it faces the end of the tube even forms an inner chamfer of the tube or deburs the latter. The cuttings which result, fall into a cutting pit 35 in the inside of the cutting head 30 and can be removed through an opening 35' in the handle 40. At some millimeters axial distance and a radial displacement of 180° from the first knife 34, a second knife 36 extends radially and inwardly, and serves to cut the periphery of the tube to form the fir-cone-shaped rib or barb 4. As can be seen from the drawings, this knife is sickle-shaped so that when cutting the rib the outwardly curving material of the tube 1 can move into a recess of the knife 36.

For a preparation of the tube 1 with the previously-described cutting head 30, the end of tube 1, cut to require length, is pushed into the cutting head 30, with the projecting knife 34, which is relatively small in radial direction, offering practically no resistance and at the most leading to a negligible impressing of a groove in the shell of the tube. After this, a relative turning of 360° between the tube and the cutting head follows, with the first knife 34 turning a cutting from the front end, and the second knife 36 cutting out the fir-cone-shaped rib 4 in the shell of the tube.

The bore head 20 comprises according to invention, on the one face end of a hollow cylinder 21, a cutting edge 22 of suitable steel and ground in a suitable way. The diameter of this knife 22 and its hollow cylinder 21 (FIG. 2) corresponds, of course, to the diameter of the tube 1. It can be seen from the drawing that this hollow cylinder 21 projects out from the respective front end of the handle 40 and is firmly anchored in an annular slot 27 in the end 23 of the handle. Here, locking screws, not shown here in detail, can permit a replacement of the hollow cylinder 21. The free surface of the hollow cylinder 21 is appropriately provided with suitable tension-relieving slots 24.

Inside the hollow cylinder 21 and coaxial with in the handle 40, a protection and centering plunger 26, supported in a guide bore 47 in the handle 40, is slidably guided axially against the effect of a spring 25. This plunger 26 comprises on its free end a pressure plate 28, which, in the normal state of the tool, juts out over the cutting edge 22 of the hollow cylinder 21, hence projecting out of the latter and thus preventing an injurious contact with the cutting edge 22. The diameter of this pressure plate 28 corresponds approximately to the inner diameter of the hollow cylinder 21. The outer end position of the pressure plate 28 is defined by an inner terminal flange 29 on the plunger 26, which interacts with an inner ring shoulder 43 in the guide bore 47 of the handle 40. On this ring shoulder 43, is supported, moreover, an end of the spring 25 which pushes the plunger 26 outwards, the other end of said spring being seated on a ring shoulder of the plunger 26.

In order to make the through bore in the case 2, the tool is first of all positioned with the pressure plate 28 of the plunger 26 on the wall of the case, when, under simultaneous turning, axial pressure is applied to the handle 40, with an axial relative movement occurring between the pressure plate 28 and the hollow cylinder 21, and the cutter 22 is, relatively gently and without catching, effective on the wall of the case.

The toll can thus be very precisely positioned on the desired place by means of the pressure plate 28. If necessary, the pressure plate 28 can also be provided with a small centering point (not illustrated), which can be positioned in a center punch indentation.

Moreover, it can be of advantage to provide the front end of the pressure plate 28 with an anti-slip coating.

Moreover, the steel hollow cylinder 21 can be rolled and the shell then pushed together bluntly along a longitudinal shell seam. In accordance with FIG. 2, the two contiguous longitudinal edges can be, thereby, radially staggered, by which a cutting edge 21 is formed, if necessary conically, which allows a tolerance-adjusting reaming.

Further, an essential simplification of the assembly of the plunger 26 is attained when in accordance with FIG. 3 the inner terminal flange 29 is constructed as a slotted, inwardly-yielding head 29'.

Thus, from the foregoing, there results a tool for making a plug connection between a plastic tube and a plastic case for electrical connection means, with an excellent handling, with regard to the necessary safety precautions.

What I claim is:

1. A tool for making a plug connection between a tube and a plastic box for electrical conductors, comprising:

an elongated handle-forming body;

means forming a cutting head at one end of said handle-forming body, said means forming said cutting head comprising a bore formed in said one end of said body and adapted to receive said tube, a first knife extending into said bore for cutting a chamfer on an end of said tube, and a second knife extending into said bore for cutting a barb-shaped rib in the periphery of said tube spaced from the chamfer; and a bore head formed on an opposite end of said body, said bore head comprising a hollow steel cylinder anchored in and projecting from said opposite end of said body and formed with a cutting edge remote therefrom for cutting a hole in said box into which said end of said tube is insertable, a protective and centering plunger coaxial with said cylinder and axially shiftable relative to said cylinder, said plunger having an end received in said body, and a spring braced against said plunger and said body for normally biasing a free end of said plunger outwardly beyond said cutting edge, said plunger having a plunger plate on said free end adapted to bear against said box to position the tool for cutting said hole and being displaceable into said cylinder during cutting of said hole.

2. The tool defined in claim 1 wherein said plunger plate is defined by a terminal flange on said plunger.

3. The tool defined in claim 1 wherein said plunger is formed with a ring shoulder and sadi body has an axially extending passage terminating in an annular shoulder juxtaposed with said ring shoulder, said spring being braced against said shoulders.

4. The tool defined in claim 1 wherein said one end of said body forms a grip engageable by the hand of a user for rotating said tool to cut said hole in said box and said opposite end of said body forms a second grip enabling said tool to be passed onto said tube to cut said chamfer and from said rib therein, said first grip being of generally oval cross section and said second grip being generally of round cross section and of similar size that said first grip whereby a transition region is formed between said grips against which the hand of a user can press to facilitate application of said tool to said tube.

* * * * *